May 12, 1964     H. J. BRITTON     3,132,837
ROTARY VALVE HAVING FREELY MOVABLE SEALING MEANS
Filed Sept. 6, 1960     2 Sheets-Sheet 1
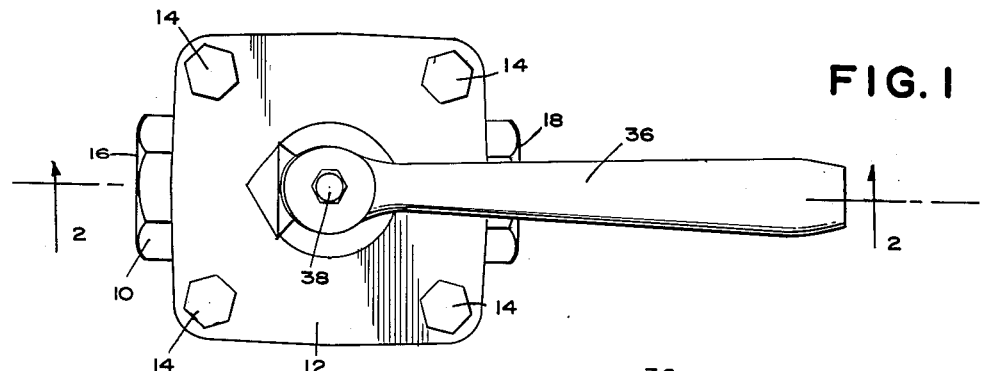
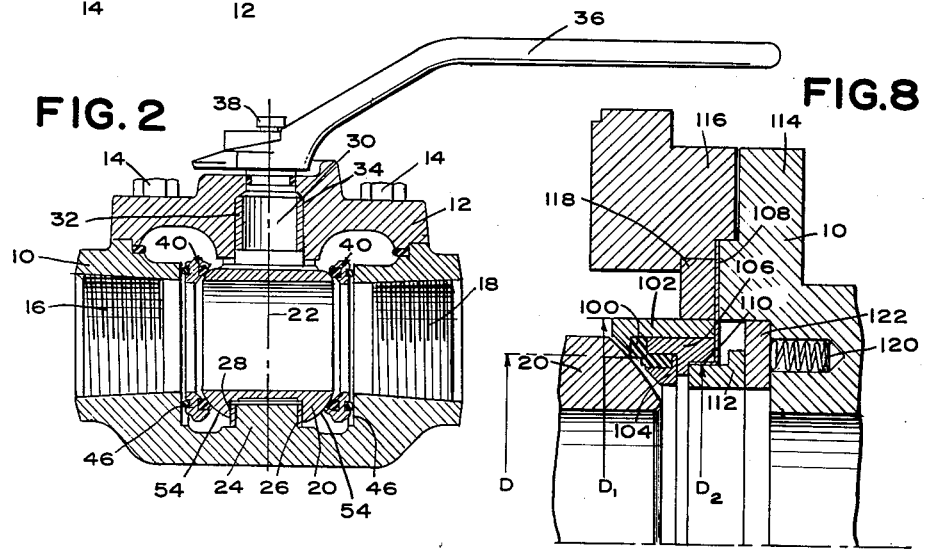
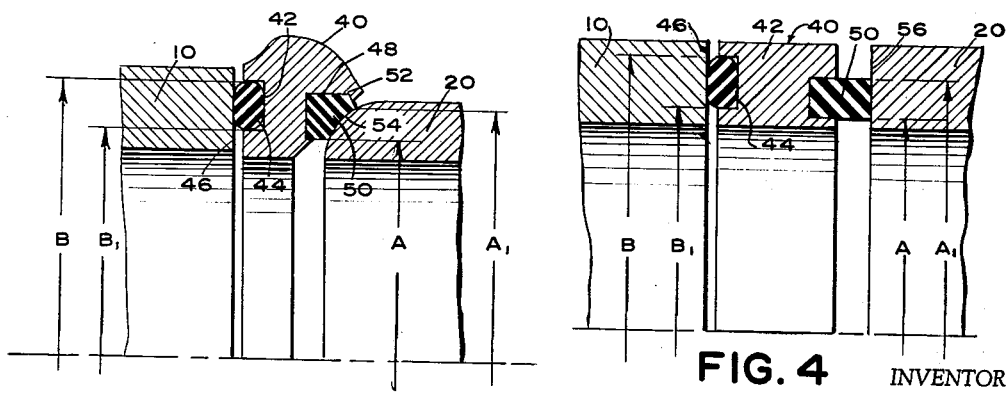
INVENTOR
HARRISON JOHN BRITTON
BY Raymond W Bolten
ATTORNEY May 12, 1964  H. J. BRITTON  3,132,837
ROTARY VALVE HAVING FREELY MOVABLE SEALING MEANS
Filed Sept. 6, 1960  2 Sheets-Sheet 2

INVENTOR
HARRISON JOHN BRITTON
BY Raymond W Cotton
ATTORNEY

United States Patent Office 3,132,837
Patented May 12, 1964

3,132,837
ROTARY VALVE HAVING FREELY MOVABLE SEALING MEANS
Harrison J. Britton, West Orange, N.J., assignor, by mesne assignments, to Crane Co., a corporation of Illinois
Filed Sept. 6, 1960, Ser. No. 54,136
6 Claims. (Cl. 251—172)

This invention relates to a rotary valve wherein the valve body is mounted in fixed bearings and the valve seat bears against the body with sufficient pressure to prevent leakage yet insufficient to damage the seat or impose undue friction upon the body.

The seat deformation inherent to conventional floating ball rotary valves causes such valves to leak prematurely and it is among the objects of the present invention to provide the primary advantages achieved with such floating ball valves while overcoming their major deficiencies.

Rotary valves conforming to the present invention comprise a housing having inlet and outlet ports, a rotary body in the housing between the ports, bearing means fixed with respect to the housing supporting the body for rotation about an axis, means defining a surface parallel to the axis intermediate one of the ports and the body, and an annular sealing member movably disposed between the body and housing providing an annular deformable seal resiliently engaging the body and an opposed deformable seal engaging the surface, the body engaging seal having an effective sealing diameter intermediate effective inner and outer sealing diameters of the surface engaging seal. In accordance with a preferred embodiment of the invention, the valve body assumes the form of a ball. Whereas the annular sealing member preferred in accordance with the present invention will effect a seal regardless of the direction from which the higher pressure is applied, such a sealing member may be interposed between each of the ports and the rotary body. The parallel surface may be plane or cylindrical. The sealing member may securely clamp one of the seals so as to be substantially unitary therewith. A valve operating element may be integral with the valve body and the body may contain a recess cooperating with the bearing means. One of the seals may assume the form of a toroidal elastomer such as a conventional O-ring. Each of the seals has an effective sealing outer diameter exceeding an effective sealing inner diameter of the other and the surface engaging seal has an effective sealing inner diameter less than the effective sealing outer diameter of the seal engaging the body.

The sealing member is movable along a path perpendicular to the axis of rotation of the body and is preferably movable in all directions relative thereto. One of the seals is preferably resilient but in any case the sealing means is preferably biased towards the body resiliently. The parallel surface may be radial and the seal engaging such surface may assume the form of a diaphragm. In accordance with one embodiment of the invention, the surface intermediate one or more of the ports and the body may be a peripheral surface and the annular sealing member may be composite and may include a plurality of relatively movable elements interposed between the body and port or ports.

A more complete understanding of the invention will follow a description of the accompanying drawings wherein:

FIG. 1 is a plan view of one form of valve to which the invention has been applied;

FIG. 2 is a sectional elevation taken along line 2—2 of FIG. 1;

FIG. 3 is a fragmentary sectional elevation on an enlarged scale of a portion of the structure depicted in FIG. 2;

FIG. 4 is a fragmentary sectional elevation depicting a modification;

FIG. 8 is a fragmentary sectional elevation on an enlarged scale depicting a portion of the structure of FIG. 7.

Figure 5:
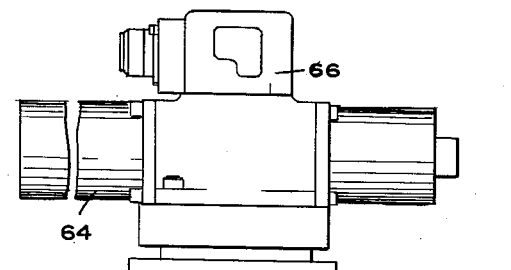
FIG. 5 is a sectional elevation of another form of valve incorporating a form of the present invention.

The valve depicted in FIGS. 1, 2 and 3 comprises a housing 10 provided with a cover 12 secured thereto by means of bolts 14. The housing is provided with ports 16 and 18 either of which may be the inlet port, the other being the outlet port. A valve body 20 is mounted for rotation about an axis 22 by means of bearings which are fixed with respect to the housing. The lower bearing is defined by a boss 24 having a liner 26 of annular form received by a cylindrical bore 28 provided in the body 20. Extending upwardly from the body 20 is a stem 30 surrounded by a sleeve or liner 32 received within a bore 34 provided by the cover 12. The stem 30 projects above the cover to receive a handle 36 which is secured to the stem by a screw 38.

Interposed between the body 20 and each of the ports 16 and 18 there is provided an annular sealing member 40 provided with a groove 42 to receive a deformable seal 44 which may assume the form of a toroidal elastomer such as an O-ring for engagement with a surface 46 provided by the housing. The surface 46 may be plane or cylindrical and in the form of the invention depicted in FIGS. 1, 2 and 3, this surface is radial. The sealing member also provides a recess or groove 48 for the reception of a deformable seal or seat element 50 which is secured in position, as depicted in FIG. 3 by deforming an outer flange 52 provided by the sealing member. In the form of the invention depicted in these figures, the body 20 assumes the form of a ball having a spherical surface 54 in engagement with the seal or seat element 50. The seal or seat element 50, which must be deformable in accordance with the present invention, engaging the valve body 20, is depicted in FIG. 3 as having an internal effective diameter A, an external effective diameter $A_1$, while the seal or O-ring 44, which is also deformable, engaging the housing surface 46 is depicted as having an outer effective diameter B and an inner effective diameter $B_1$. It will be noted that the outer effective diameter B of the seal 44 exceeds the inner effective diameter A of the seal 50 and the outer effective diameter $A_1$ of the seal 50 exceeds the inner effective diameter $B_1$ of the seal 44. Under these circumstances, where the effective pressure is from the left as viewed in FIGS. 2 and 3 with the port 16 serving as the inlet port and the valve body rotated to a position at 90° from that shown to assume a closed position, the force biasing the sealing member and its seal or seat element 50 towards the valve body is the function of the line pressure acting on an annular area defined between diameters B and A.

With the valve in the same position and the higher pressure coming from the right so that the port 18 serves as the inlet port, referring to FIG. 3, the force urging the sealing member 40 and its seal or seat element 50 towards the valve body is produced by the line pressure acting on an annular surface produced between the diameters $A_1$ and $B_1$. Thus, by properly computing these effective diameters for the various conditions and materials encountered, seals can be achieved which are sufficient to prevent leakage and at the same time insufficient to damage the materials employed. The resilience of the seal 44 and its deformability contribute greatly to the achievement of these outstanding results. Materials successfully used for the body engaging seal or seat element include rubber, Teflon, nylon and Kel-F.

It will be understood that when the internal pressure is higher, it acts on the O-ring at its internal diameter $B_1$, producing flow in the O-ring so that the sealing effect will occur at the diameter B. Conversely, when the external pressure is higher, it will be applied at the diameter B of the O-ring, causing deformation to produce the sealing effect at the diameter $B_1$.

Referring to FIG. 4, the arrangement is somewhat similar, the difference residing primarily in the configuration of the body 20 having a surface 56 for engagement with the seal or seat element 50 which is cylindrical instead of spherical. The diameter relationships are the same however, so as to produce a seal between the housing and rotary body when the valve is closed regardless of the direction from which the higher pressure is directed. Whereas two such sealing members have been depicted in FIG. 2, it will be understood from the foregoing description that one such sealing member would be sufficient without the other.

Figure 6:
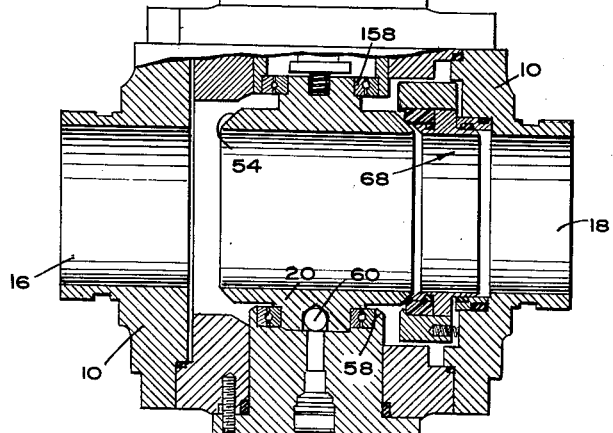
FIG. 6 is a fragmentary sectional elevation on an enlarged scale of a portion of the structure depicted in FIG. 5.

FIGURES 5 and 6 depict another form of valve embodying the invention. In this case the housing 10 receives a body 20 having a spherical surface 54 and mounted in antifriction bearings 58 to reduce friction during operation of the valve. The body is provided with a thrust bearing 60 and the housing contains a bleeder plug 62. An actuator 64 and switch housing 66, constituting no part of the present invention are also provided.

The sealing member 68 is composed of two annular assemblies 70 and 72. The annular assembly 70 comprises a metal inner ring 74 and a metal outer ring 76 between which the deformable seal or seat element 78 is secured for engagement with the spherical surface 54 of the valve body. An O-ring 80 is received within a groove formed in the inner ring 74 to assure its sealing engagement with the seat element 78. The inner ring is provided with a skirt 82 having an outer periphery in sliding engagement with the inner periphery 84 of the annular assembly 72 provided with an internal groove 86 receiving an O-ring 88 and an external groove 90 receiving an O-ring 92. The internal O-ring 88 engages the skirt 82 in sealing relationship and the external O-ring 92 engages a peripheral cylindrical wall 94 provided by the housing 10. Thus, both annular assemblies 70 and 72 are axially movable with respect to the valve body, the housing and one another. When the valve body is rotated through an angle of 90° with respect to the position depicted in the drawings, assuming the high pressure to be coming from the left, the differential force tending to move the seat element 78 into contact with the body will be a function of the line pressure acting on an annular area having an outer diameter D and an inner diameter $D_1$ where D is the effective diameter of the seal between the valve body and the sealing element 78 and $D_1$ is the diameter at which the inner O-ring 88 engages the skirt 82. With the valve closed and the high pressure coming from the right, the differential force with which the seat element 78 is urged into contact with the valve body will be a function of the line pressure acting on an annular area having an outer effective diameter $D_2$ and an inner effective diameter D where $D_2$ is the diameter at which the outer O-ring 92 engages the cylindrical surface 94 of the housing and D is the diameter at which the sealing element 78 engages the valve body. Thus it will be evident that only one such sealing member, as disclosed in FIG. 5 will be required to assure an adequate seal between the housing and body regardless of the direction from which the high pressure is effective.

Figure 7:
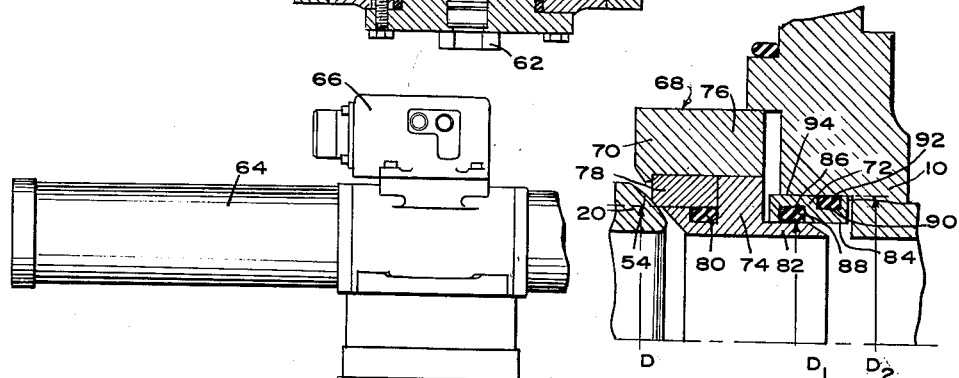
FIG. 7 is a sectional elevation, partly broken away, depicting another form of valve incorporating a form of the present invention.

Referring to FIGS. 7 and 8, another form of valve embodying the invention in a modified form has been depicted. Here again, two movable assemblies are provided intermediate or between the housing 10 and body 20 to produce a seal. One of the assemblies comprises a seal or seat element 100 secured between an outer ring 102, an inner ring 104 and an intermediate ring 106, a diaphragm 108 having an axial skirt 110 clamped between the intermediate ring 106 and a clamping ring 112, the outer periphery of the diaphragm being clamped between flanges 114 and 116 provided by the housing parts, a backing ring 118 serving to support the diaphragm against excessive movement in one direction. Where the diaphragm lacks a biasing effect tending to move the seat element towards the valve body, light springs 120 compressed between the housing 10 and a bearing ring 122 tend to maintain the seat element in contact with the body without contributing appreciably to the sealing effects under operating conditions. Similarly, the springs of the other modifications are very light and produce no appreciable sealing effects under operating conditions, serving primarily to produce an initial sealing engagement. The effective diameter of the seal defined between the seat element 100 and valve body 20 has been designated D, the outer diameter of the ring 102 has been designated $D_1$ and the inner diameter of the diaphragm skirt has been designated $D_2$. With the valve closed and assuming the high pressure to exist at the left, the differential force urging the seat element towards the valve body will be a function of the line pressure acting on an annular area having an outer diameter D and an inner diameter $D_2$. Assuming the high pressure to exist at the right, the differential force tending to move the seat element towards the valve body will be a function of the line pressure on an annular area having an outer diameter $D_1$ and an inner diameter D. Thus, here again, it will be clear that only one such sealing member assembly is required regardless of the direction from which the pressure is introduced.

Whereas only a limited number of modifications have been disclosed for purposes of illustration, such variations as will suggest themselves to those skilled in the art are contemplated within the scope of the appended claims.

I claim:

1. A rotary valve comprising a housing having inlet and outlet ports, a rotary body in said housing between said ports, bearing means fixed with respect to said housing supporting said body for rotation about an axis substantially normal to said ports, means in said housing defining a surface parallel to said axis intermediate one of said ports and said body, and an annular sealing member freely movable in all directions disposed between said body and said housing, an annular deformable seal secured to and projecting axially beyond said sealing member and resiliently engaging said body and an opposed deformable annular seal secured to said sealing member and projecting axially beyond said sealing member and engaging said surface, said body engaging seal having an effective sealing diameter intermediate effective inner and outer sealing diameters of said surface engaging seal and maintaining said body and sealing member in spaced relationship at all times, and said surface engaging seal maintaining said sealing member and said surface in spaced relationship at all times.

2. A rotary valve as set forth in claim 1 wherein a surface substantially parallel to said axis is defined intermediate each of said ports and said body and an annular sealing member provides opposed deformable seals engaging said body and each of said surfaces.

3. A rotary valve as set forth in claim 1 wherein said body contains a recess cooperating with said bearing means.

4. A rotary valve as set forth in claim 1 wherein one of said seals is a toroidal elastomer.

5. A rotary valve as set forth in claim 1 wherein each of said seals has an effective sealing outer diameter exceeding an effective sealing inner diameter of the other.

6. A rotary valve as set forth in claim 1 wherein said body is a ball.

References Cited in the file of this patent

UNITED STATES PATENTS

| | | |
|---|---|---|
| 2,603,449 | Overholser | July 15, 1952 |
| 2,799,470 | Margrave | July 16, 1957 |
| 2,868,498 | Kaiser | Jan. 13, 1959 |
| 2,916,254 | Wendell | Dec. 8, 1959 |
| 3,036,590 | Knox | May 29, 1962 |

FOREIGN PATENTS

| | | |
|---|---|---|
| 655,078 | Great Britain | July 11, 1951 |